Feb. 16, 1954

J. A. FLINT 2,669,344

BALANCED SECTIONALIZED VIBRATORY CONVEYER

Filed Sept. 23, 1950

INVENTOR;
JAMES A. FLINT,
BY

Attorney.

Feb. 16, 1954 J. A. FLINT 2,669,344
BALANCED SECTIONALIZED VIBRATORY CONVEYER
Filed Sept. 23, 1950 8 Sheets-Sheet 2

INVENTOR;
JAMES A. FLINT,
BY
Attorney.

Feb. 16, 1954   J. A. FLINT   2,669,344
BALANCED SECTIONALIZED VIBRATORY CONVEYER
Filed Sept. 23, 1950   8 Sheets-Sheet 7

INVENTOR;
JAMES A. FLINT,
BY
ATTY.

Patented Feb. 16, 1954

2,669,344

UNITED STATES PATENT OFFICE 2,669,344

BALANCED SECTIONALIZED VIBRATORY CONVEYER

James A. Flint, Bexley, Ohio, assignor to The Jeffrey Manufacturing Company, a corporation of Ohio Application September 23, 1950, Serial No. 186,406

13 Claims. (Cl. 198—220)

This invention relates to a vibratory conveyer, preferably having a relatively low speed of vibration, which is balanced so that the main supporting frame is substantially devoid of vibratory movement.

An object of the invention is to provide apparatus of the above mentioned type in which the vibratory unit includes a common base with a plurality of successively arranged conveyer troughs, decks, or the like, one feeding to the other, and in which counterbalancing means is connected to each trough or deck, the counterbalancing means for each trough or deck being preferably positioned below the other trough or deck.

Another object of the invention is to provide a conveyer of the above mentioned type in which the driving means includes a shaft mounted for rotation on a relatively stationary spin axis and which is provided with two eccentrics preferably one hundred and eighty degrees out of phase which individually are connected to the two sections of said conveyer deck or trough.

A further object of the invention is to provide a simple, efficient crank vibrating mechanism to move two conveyer sections simultaneously in opposite directions, and an improved conveyer including such vibrating mechanism.

Another object of the invention is to provide a conveyer of the above mentioned type in which reciprocating hydraulic motor means is provided for vibrating the deck sections, said hydraulic motor means including a pair of cylinders mounted so that the vibratory forces tend to balance each other, but resiliently supported from the conveyer base.

Other objects of the invention will appear hereinafter, the novel features and combinations being set forth in the appended claims.

One of the difficulties encountered in vibratory equipment, such as vibratory screens, conveyers, and the like, is that in many such devices there is considerable vibration inherently present in the main frame or supporting member which precludes its resting directly on the floor or frame structure of a building and requires that it be supported upon resilient means which creates a problem and makes moving of the unit difficult.

The vibratory conveyer of this invention is designed so that the vibration in the main frame is very materially reduced so that the unit may sit on or be attached to the floor or to the frame structure of a building without causing undesirable vibration therein and without any appreciable tendency for the unit to creep or walk when in operation.

In the embodiment illustrated in Figs. 1, 2, 3, 5 and 6 of the drawings the unit includes a main frame or base 10 which may be formed of a pair of longitudinally extending I-beams rigidly attached together by cross angles or the like. At longitudinally spaced intervals the main frame is provided with transverse brackets 11 adapted to receive the bottoms of a plurality of stacked cantilever bars of which there is a pair of outside bars designated 12 and a pair of inside bars designated 13. The cantilever bars 12 and 13 are of similar laminated construction and need no special description. They are all set at the same angle which is preferably inclined to the vertical approximately 30° so as to impart a conveying action to the decks or troughs 14 and 15 which are supported at the upper ends of the cantilever bars 12 by appropriate brackets 16 (see Fig. 5).

Figure 1:
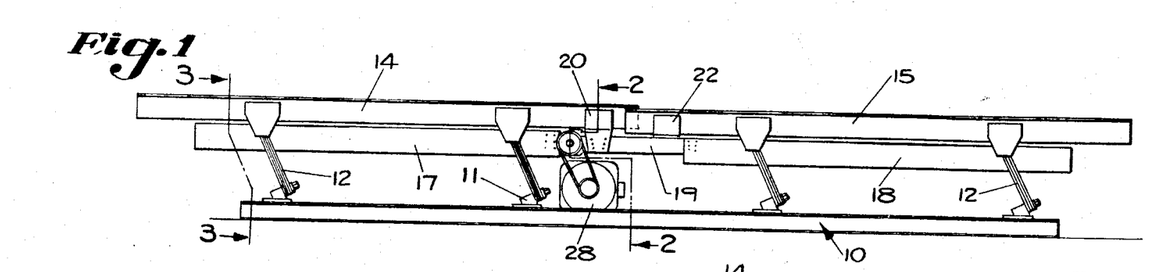
Fig. 1 is a side elevational view of a conveyer incorporating the features of my invention.

As illustrated in Fig. 1 of the drawings, each of the individual troughs or decks 14 and 15 is supported by four cantilever bars 12, though the number may be increased, if desired. The bottoms of the cantilever bars 12 and 13 are removably but rigidly attached to the brackets 11 by machine screws or the like. Likewise, the upper ends of the cantilever bars 12 are rigidly but removably attached to the brackets 16 by bolts or the like.

Figure 5:
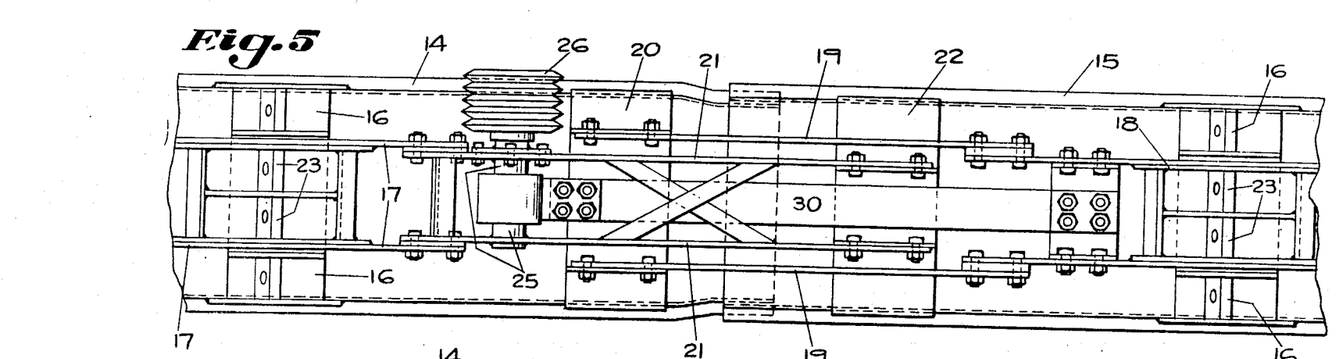
Fig. 5 is a plan view looking from the bottom upward onto the decks and counterweights or counterbalances, the cantilever bar supports being omitted from this view of the drawings in the interest of clearness.
Figure 6:
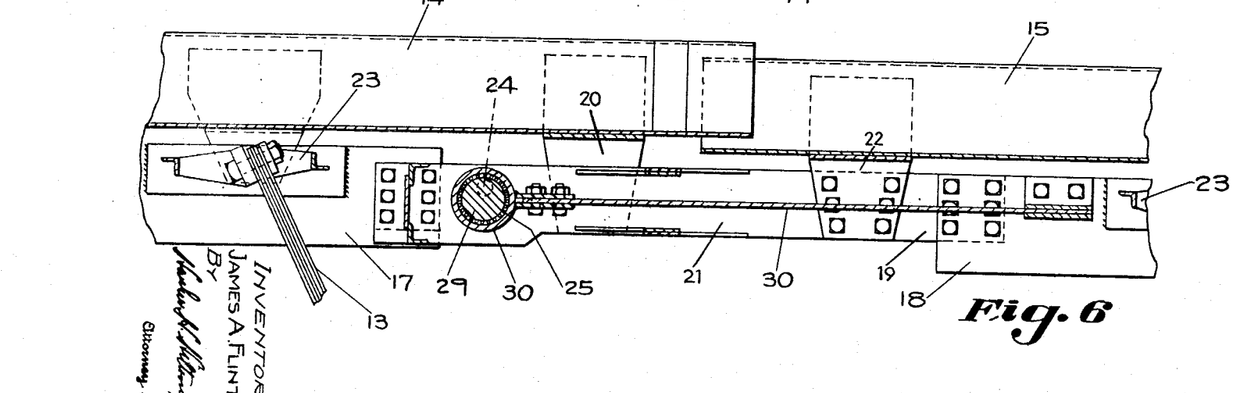
Fig. 6 is a sectional elevational view showing the apparatus illustrated in Fig. 5.

Positioned directly below each trough or deck 14 and 15 there is a counterweight or counterbalance, that below trough 14 being designated 17 and that below trough 15 being designated 18. The counterbalances 17 and 18 are essentially of similar construction and are merely frames built up of longitudinally extending vertical plates with appropriate cross-connecting members, such as illustrated in Fig. 5 of the drawings. Each of the counterweights 17 and 18 is supported at the upper ends of pairs of cantilever bars 13 which are substantially identical with the bars 12 and are located adjacent them and have the same normal inclination.

Figures 2, 3, 4:
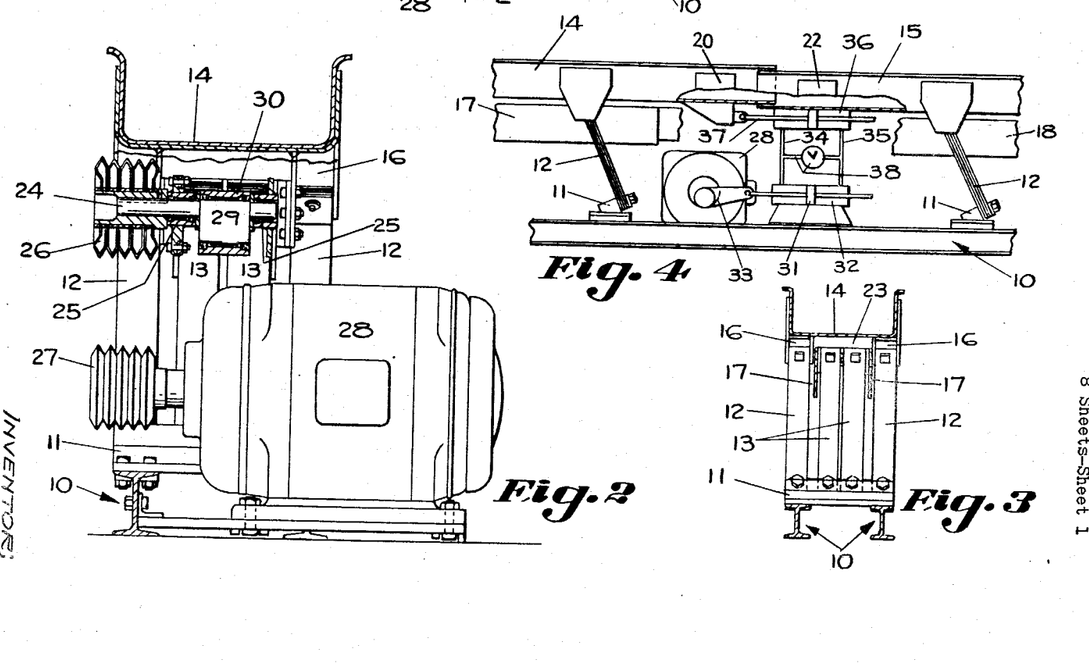
Fig. 2 is a sectional view showing particularly the drive mechanism and taken on the line 2—2 of Fig. 1, looking in the direction of the arrows, the drive belts being omitted.
Fig. 3 is a sectional view taken on the line 3—3 of Fig. 1, looking in the direction of the arrows.
Fig. 4 is a side view of a modified form of power actuating means for the conveyer.

As clearly illustrated in Fig. 3 of the drawings, adjacent pairs of cantilever bars 12 and 13 have their bottoms rigidly attached by machine screws to the same bracket 11, the upper ends of the bars 12 being connected to the deck, such as the deck 14, while the upper ends of the bars 13 are connected to the counterweight, such as counterweight 17, by brackets 23. It is thus evident that any forces developed in the bars 12 and 13 are transferred to the same bracket 11 associated with any group of cantilever bars.

As illustrated in Figs. 1 and 5 of the drawings, the deck or trough 14 is connected to the counterweight 18 through connecting rods, bars or plates 19 and bracket 20. Similarly, the deck or trough 15 is connected to the counterweight 17 through connecting rods, bars or plates 21 and bracket 22. As a consequence, it is evident that each counterweight is positioned directly below and adjacent the particular deck or trough other than the one to which it is connected. It is also evident from the above description that each counterweight is supported by substantially the same number of cantilever bars as the associated and connected deck, since all the cantilever bars, both for the counterweights and the decks, are similar in size, length and all other characteristics, and the same number is employed to support the decks and associated counterweights. In the illustrated embodiment each deck 14 and 15 is supported by four cantilever bars 12, and each counterweight 17 and 18 is supported by four similar cantilever bars 13, all of the same length and number of laminations.

The weight of each counterweight 17 and 18 is approximately the same as, but preferably just a little greater than, the deck or trough 14 or 15 to which it is connected. This is for the reason that the material flowing along the deck adds a certain amount of dead weight to it and it is desirable that the reaction forces transmitted by the decks 14 and 15 and the counterweights 17 and 18 to the main frame 10 substantially balance as they will where the effective weight of the deck (actual weight plus a portion of the load) is substantially equal to the effective weight of the counterweight.

As illustrated in the drawings, positive eccentric mechanism is provided to give a positive relative motion to the two deck sections 14 and 15 and their counterweights 17 and 18. In operation the two deck sections 14 and 15 will vibrate in opposite directions at any given instant. The conveying action on the material, however, will be such as to convey said material in the same direction, which is to the right as viewed in Fig. 1 of the drawings, so that material delivered to the left-hand end of the trough or deck 14 will be given a conveying action, causing it to move to the right so that the material is fed from the deck 14 onto the deck 15.

The vibratory mechanism includes a shaft 24 (see Fig. 2) mounted in appropriate bearings 25 carried by the fabricated connecting rod or shaft 21 (see Fig. 5) including a pair of spaced upright plates. Shaft 24 has a multiple V-pulley 26 on its free outer end which is adapted to be driven by a multiple V-belt from a multiple V-pulley 27 carried on the shaft of a driving electric motor 28 which may be supported on a platform rigidly attached to the main frame 10 as illustrated in Fig. 2 of the drawings. Shaft 24 is provided with an eccentric 29 having an associated eccentric strap 30 which is rigidly connected to counterweight 18. The connecting rod or shaft 21 is in turn rigidly connected to the counterweight 17, as clearly illustrated in Figs. 5 and 6 of the drawings.

It is thus obvious that upon rotation of the shaft 24 a positive vibratory motion will be developed between the counterweight 17 and the counterweight 18 through the eccentric 29 and strap 30. Furthermore, since the deck 14 is rigidly attached to the counterweight 18 through the connecting rods or bars 19, these two units will have the same motion, particularly since they are mounted on the base 10 through similar cantilever bars 12 and 13. Similarly, since the counterweight 17 is rigidly attached to the deck 15 through the connecting rods or bars 21, they will partake of the same motion. The decks 14 and 15 are preferably substantially of the same weight as are the counterweights 17 and 18 and this is desirable in the interest of a balanced system.

It is obvious that the throw of the eccentric 29 is determined by its eccentricity. For example, the total relative movement between the two counterweights for each reciprocation may be of the order of one-half inch. In this case, with the two vibratory systems balanced, the two systems being in the one case the deck 14 and its counterweight 18 and in the other case the deck 15 and its counterweight 17, this throw will be substantially evenly divided between them, so that the two decks 14 and 15 will have substantially the same amplitude of vibration, and thus the same capacity since they are of the same depth and width, which in the illustration given will be of the order of one-quarter inch.

From the above description it is evident that there is a complete balance throughout. Furthermore, it is evident that the counterbalancing mechanism is confined between the decks 14 and 15 and the main frame 10 and within the lateral confines of said decks 14 and 15 and their supporting cantilevers 12. This makes for a practical, compact, balanced unit.

In Fig. 4 of the drawings a modified form of vibratory driving mechanism is illustrated. As here illustrated, in place of the eccentric type drive I employ a hydraulic drive. Here the electric motor 28 causes a piston 31 to reciprocate in a cylinder 32 through a crank mechanism 33 whenever the motor 28 is energized. Opposite sides of the cylinder 32 are connected by individual pipes 34 and 35 to opposite ends of a cylinder 36 which is rigidly attached to the deck 15. One end of a double ended piston rod 37 is pivotally attached to the deck 14. Other connections, particularly between the decks 14 and 15 and their counterweights 18 and 17, respectively, are essentially the same as above described.

A bleeder pipe and control valve 38 is provided so that the amplitude of vibration of the unit may be controlled by controlling the amount of bleed between pipes 34 and 35.

In the operation of the device of Figs. 1, 2, 3, 5 and 6 or of Fig. 4, material to be conveyed, such as granular material, will be fed preferably to the left-hand end of the deck or trough 14. The vibratory system will be mechanically tuned to a frequency preferably slightly below the operating frequency which will be determined by the speed of rotation of the motor 28 and other well known factors. Due to the inclination of the cantilevers 12 the vibratory action on the granular material will cause it to travel to the right, as viewed in Fig. 1 of the drawings, discharging the material from the trough 14 onto the trough 15. The conveying action on the material in trough 15 is essentially the same as in trough 14, with the result that the granular material is ultimately discharged over the right-hand end or discharge end of said trough 15.

The forces developed in the cantilevers 12 are substantially neutralized by the forces developed in the cantilevers 13 insofar as the main frame 10 is concerned so that it is substantially free of severe vibration. In view of this fact the unit may be readily placed upon the floor or any of the frame portions of a building and need not be anchored against walking or creeping and will not produce objectionable noise or vibration. It is thus readily movable from one place to another, if desired.

In Figs. 7 to 11 of the drawings there is illustrated a modified form of driving means for the conveyor, which driving means overcomes a characteristic of the conveyor of Figs. 1, 2 and 3 which is sometimes considered objectionable; that is, in the conveyor of Figs. 1, 2 and 3 it will be noted, by reference particularly to Fig. 2 of the drawings, that the shaft 24 is rotatably mounted in bearings 25 carried by the bars or plates 21 which vibrate with the counterweight 17 and the deck 15. As a consequence, the pulley 26 continuously reciprocates during operation of the machine, with a resulting whipping of the drive belt thereof. In the construction of the driving mechanism of the conveyor of Figs. 7, 8 and 9 this whipping action has been eliminated, and the drive pulley rotates on a relatively stationary spin axis.

Referring to the particular apparatus provided to accomplish the result above mentioned, it will be seen that the drive mechanism includes a transverse horizontally extending shaft 39 having a spin axis 40 which is along the geometrical axis of said shaft 39. The shaft 39 is supported by spaced bearings 41 and 42 at opposite ends of a U-shaped yoke 43 which constitutes the upper end of a pivoted arm 44, the lower end of which is provided with a transverse horizontally extending cross shaft 45 pivotally mounted in rubber bushings, or the like, 46 carried by bearing boxes 47 mounted on the spaced rails of the main frame or base 10. It is thus evident that the shaft 39 is mounted for limited pivotal or swinging movement about the transverse horizontal axis of the shaft 45, but is held in a relatively fixed position against vertical or up and down movement. One end of the shaft 39 projects adequately to receive a drive pulley 48 (see Figs. 7 and 8) adapted to be driven from the motor 28 by a plurality of V-belts, or the like.

At the generally central portion of the shaft 39 there is a central eccentric 49, the eccentricity of which with respect to the spin axis is illustrated by the eccentricity line 50. To opposite sides of the central eccentric 49 there are eccentrics 51 and 52 which have the same eccentricity as suggested by the line 53. Eccentrics 51 and 52 constitute a pair of eccentrics which are preferably 180° out of phase with the central eccentric 49 and the eccentricity of said pair with respect to the spin axis of the shaft 39 is equal and opposite to that of the central eccentric 49.

Figures 9, 14, 15:
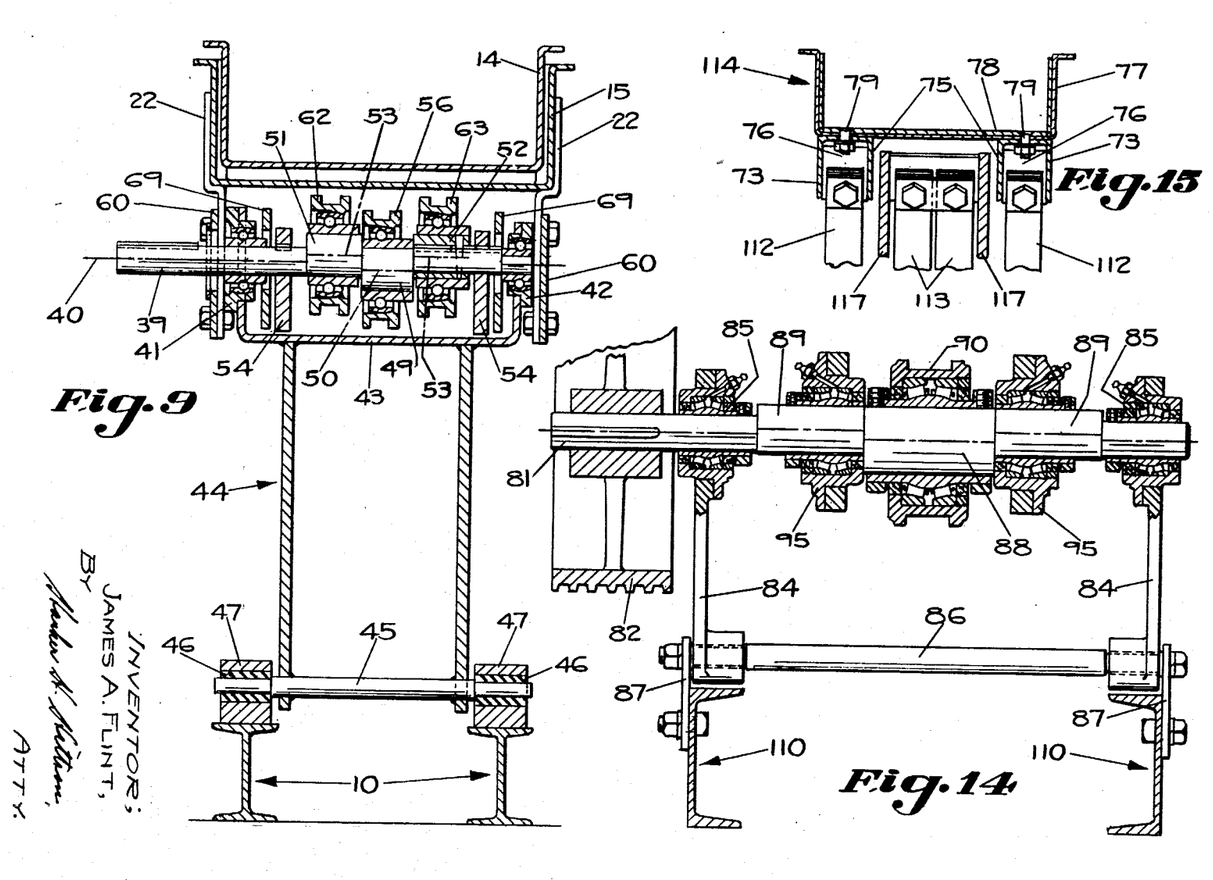
Fig. 9 is a sectional elevational view taken on the line 9—9 of Fig. 7, with the drive pulley and associated drive belt omitted.
Fig. 14 is a transverse sectional view through the axis of the eccentric drive mechanism of the conveyer of Figs. 12 and 13.
Fig. 15 is a transverse sectional view on a somewhat reduced scale, showing the removable deck and deck frame of the conveyer of Figs. 5–14.

The eccentric 52 is built up of several parts, as illustrated in Fig. 9 of the drawings, to permit the ready removal of the inner race of the antifriction bearing of the pitman or connecting rod associated with the central eccentric 49. If desired, the shaft 39 may also carry a pair of spaced counterweights 54 so as to balance the rotating system including the shaft 39 and its eccentrics and thus prevent unnecessary and useless vibration during the operation thereof.

Connected to be driven by the central eccentric 49 is an eccentric connecting rod or pitman 55 (see Fig. 10) having a strap 56 associated with the eccentric 49 and having a head 57 pivotally attached to a pin 58 by means of a rubber bushing, or the like, said pin 58 being carried by a bracket 59 (see Fig. 11) rigidly attached to the counterweight 17. As clearly illustrated in Fig. 8 of the drawings, the counterweight 17 is connected to the deck or trough section 15 through the bracket 20 by means of spaced connecting plates or bars 60 and connecting blocks 61.

The two eccentrics 51 and 52 have associated straps 62 and 63, respectively (see Fig. 9), which are connected to a head 64 (see Fig. 8) attached to a connecting rod or pitman 65 having a head 66 at its end pivotally connected to a pivot pin 67 through a rubber bushing, said pivot pin 67 being attached to a connecting bracket 68 which is rigidly attached to the counterweight 18. As clearly illustrated in Fig. 8 of the drawings, counterweight 18 is rigidly attached to the deck or deck section 14 through the bracket 22 by means of connecting plates or rods 69 and blocks 70.

From the above description it is evident that the pivoted arm 44 will support the shaft 39 or, in other words, support the static weight thereof and the mechanism carried thereby while providing for limited oscillatory motion thereof about the horizontal transverse axis of the shaft 45. During operation of the machine, when the shaft 39 is rotated it will rotate about its spin axis 40 which will be substantially stationary. The equal throw of oppositely extending eccentrics 49 and 51, 52 in cooperation with their associated straps and connecting rods will impart equal and opposite reciprocating forces to the two decks or deck sections 14 and 15 and their connected counterweights 18 and 17, respectively.

The operation of the conveyer is essentially that described in connection with the conveyer of Figs. 1, 2, etc., the principal and significant difference being that there is no appreciable vibration of the pulley 48 and consequently no undesirable whipping of the associated driving V-belts.

Figures 10, 11:
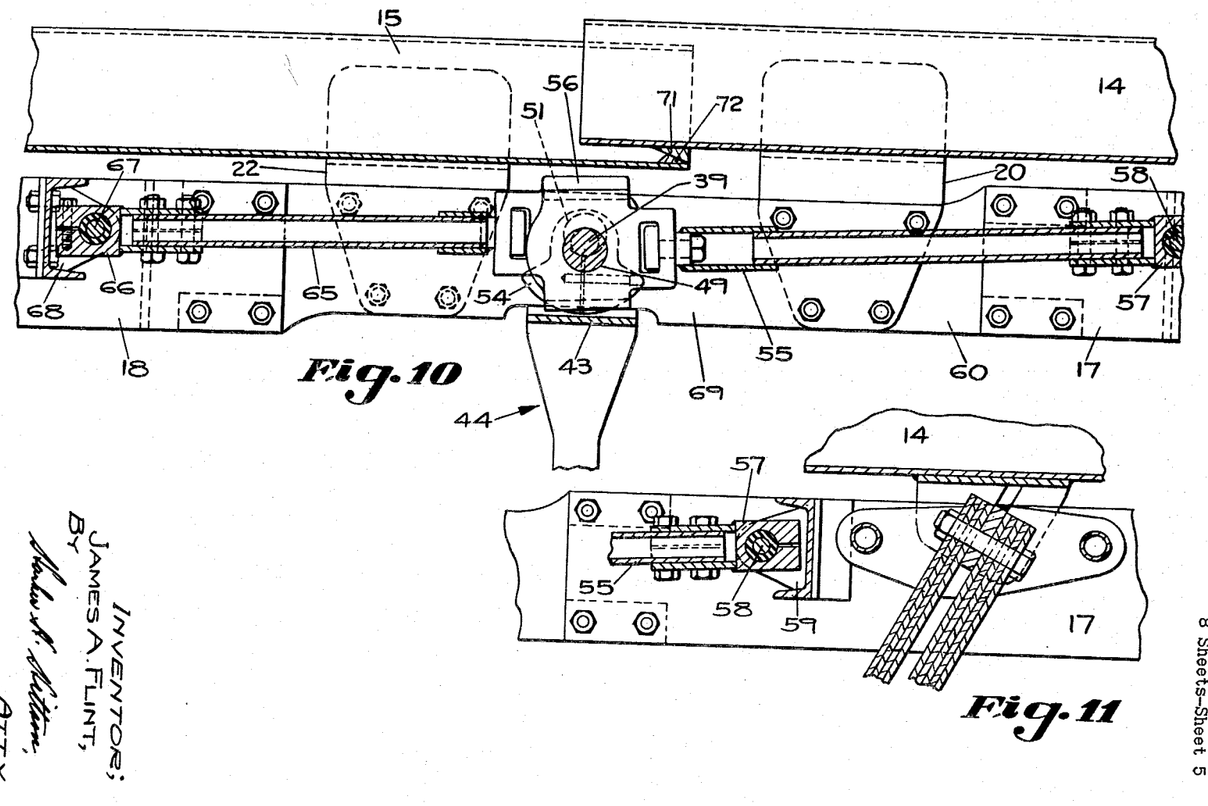
Fig. 10 is an enlarged longitudinal sectional view through the center of the conveyer of Figs. 7–9, showing particularly the eccentric drive and the connecting straps and rods or pitmans which interconnect the deck sections with their relative eccentrics.
Fig. 11 is an enlarged sectional view, showing particularly the spring mounting of one end of one of the counterweights and its connection to an eccentric connecting rod or pitman.
Figure 12:
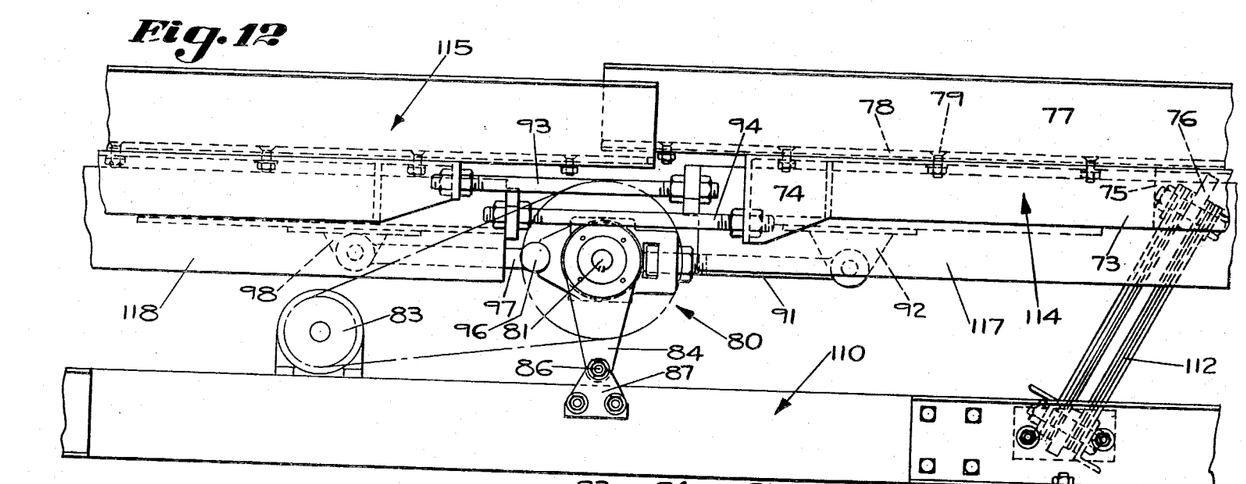
Fig. 12 is an enlarged side elevational view of the driving mechanism and adjacent trough ends of still another form of conveyer embodying the features of my invention.
Figure 13:
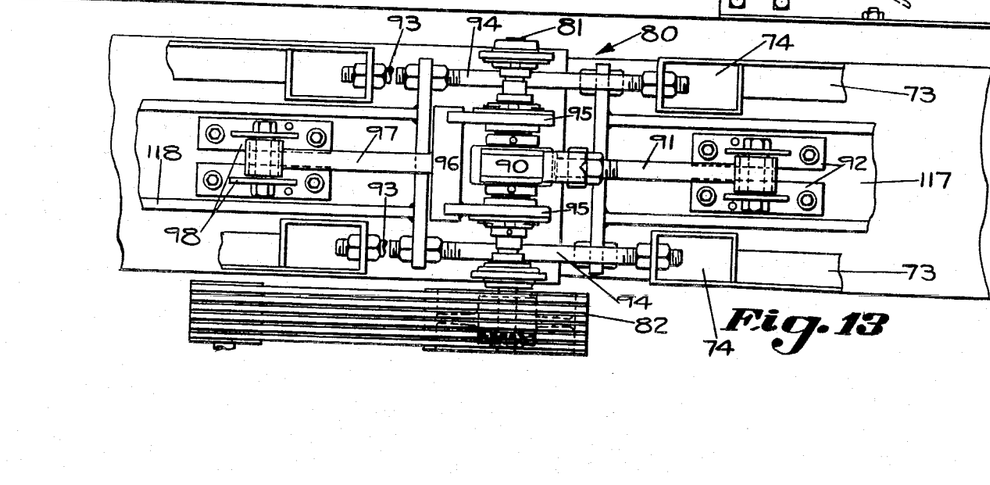
Fig. 13 is a plan view, looking upward, showing particularly the driving mechanism of the conveyer of Fig. 12 and its connection to the various counterweights and deck sections.

There is another characteristic provided in the conveyer of Figs. 7 to 11, inclusive, which is illustrated in Fig. 10 of the drawings and which is provided to prevent any significant loss of material over the receiving end of the trough 15 which is the right-hand end, as viewed in Fig. 10 of the drawings.

On the upper surface of the bottom plate of the trough 15 and adjacent the receiving or right-hand end thereof and extending transversely of the width of said bottom plate there is a dam or barrier 72, which has a flat sloping upper surface which lies in a plane substantially along the plane of vibration of said decks 14 and 15 which is at right angles to the axis of the cantilevers 12. In frictional contact with said plane sloping upper surface of the dam 72 there is a cooperating dam 71 having a similar sloping surface, the dam 71 being carried on the lower surface of the bottom pan of the trough or deck 14 adjacent the discharge end thereof. Thus during relative vibration of the two trough or deck sections 14 and 15, the two dams 71 and 72 will slide with their flat surfaces in contact with each other, thus effecting a seal between the two troughs 14 and 15. One or both of the dams 71 and 72 may be made of brass or the like.

Figs. 12, 13, 14 and 15 illustrate another form of balanced sectionalized vibratory conveyer incorporating the above described features of my invention as well as a feature not heretofore described. In this embodiment of the invention there is a main frame or base 110 formed of spaced-apart longitudinally extending angular members, or the like, which support a pair of decks or deck sections 114 and 115 for vibratory motion through inclined cantilever spring means 112. It will be understood that there are a plurality of said spring means 112 longitudinally spaced along the base 110 and supporting opposite ends of each of the decks 114, 115 in a manner similar to the supporting of the decks 14 and 15 from the base 10, as previously described.

Below the deck 114 is a counterweight 117 which is rigidly connected with the deck 115, as hereinafter described, and below the deck 115 is a counterweight 118 which is rigidly connected with the deck 114, as also hereinafter described. Counterweights 117 and 118 are supported on cantilever springs 113 similar to the manner in which the counterweights 17 and 18 are supported from the base 10 by cantilever springs 13. In other words, the general arrangement of the base or main frame, the two decks and their individually connected counterweights, and the manner in which the decks and counterweights are supported from the base frame, is fundamentally the same in all of the conveyers heretofore and hereafter described.

The decks 114 and 115 are of generally similar construction and differ from their counterparts in the heretofore described conveyers in the following particulars. Deck 114 will be specifically described, it being understood that the general construction thereof is followed in deck 115. Said deck 114 includes a deck frame comprising a pair of longitudinally extending laterally spaced angles 73 (see Fig. 13) which at their inner ends are provided with spaced flanges to form terminal boxes 74. At spaced longitudinal positions the angle members 73 are also provided with head plates 75 (see Fig. 15) which cooperate with the upright web of the angle member 73 to carry inclined cross plates 76 (see Figs. 12 and 15) to which the upper ends of the spring bars 112 are bolted. It is thus evident that the deck frame formed by the angle members 73 is directly supported from the cantilever spring bars 112, there being at least four such spring bars supporting each said deck frame.

Rigidly attached to but removable from the deck frame formed by the angles 73 is a trough 77 having a removable bottom liner 78 which is attached to the trough 77, the two being removably attached to the angle deck frame members 73 by a plurality of spaced bolts and nuts 79. It is thus evident that in this construction the deck trough 77 may be readily changed since it is easily removable from the deck frame formed by angle members 73 and without removing the set-up of the bars 112. It is likewise evident that the bottom of the trough or pan 77 as it becomes worn may be readily renewed.

Figure 7:
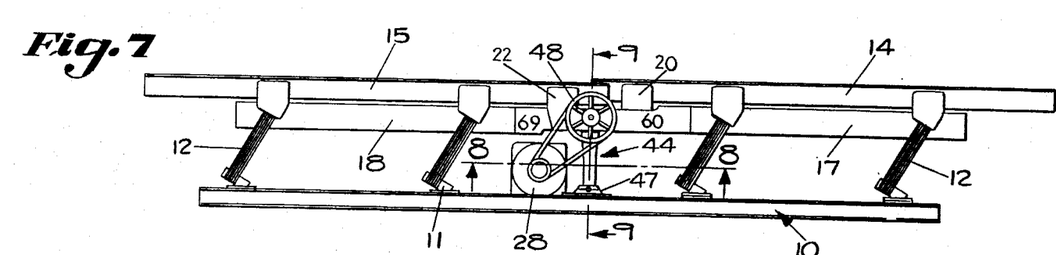
Fig. 7 is a side elevational view of another form of conveyer embodying features of my invention.
Figure 8:
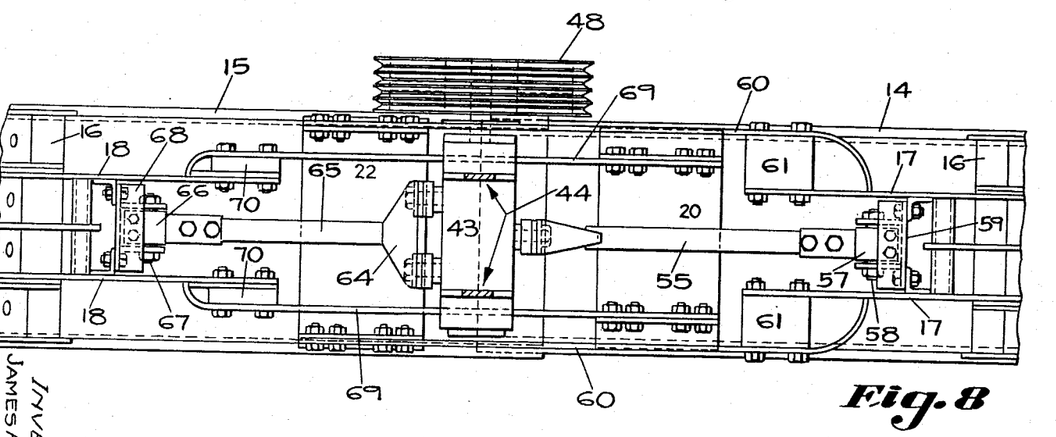
Fig. 8 is a plan view looking upward and taken on the line 8—8 of Fig. 7, with parts omitted.

The conveyer of Figs. 12 to 15 is provided with a vibratory mechanism 80 which is essentially the same as that described for the conveyer of Figs. 7 and 8, etc. Briefly described, said vibratory mechanism 80 includes a transverse horizontally extending shaft 81 adapted to rotate on its geometrical and spin axis and carrying a driving pulley 82 at one end which is driven through a plurality of V-belts from a motor 83. The shaft 81 is supported by a pair of pivot arms 84 through anti-friction bearings 85 at the upper ends of said arms, the lower ends of said arms 84 being pivotally attached to a cross pivot shaft 86 which in turn is supported by spaced brackets 87 carried by the frame channels 110.

The shaft 81 is provided with a central eccentric 88, on each side of which there is an oppositely extending eccentric 89, the two eccentrics 89 being 180° out of phase with eccentric 88 and being eccentric by the same amount as said eccentric 89 with reference to the spin and geometric axis of the shaft 81. An eccentric strap 90 associated with eccentric 88 is connected to drive the counterweight 117 through a connecting rod 91 which is pivotally connected to a bracket 92 which in turn is rigidly connected to the counterweight 117. Counterweight 117 in turn is rigidly connected to the deck 115 by a pair of laterally spaced horizontal longitudinally extending adjusting tie bolts 93. Counterweight 118 is similarly connected to deck 114 by a pair of laterally spaced longitudinally extending horizontal adjusting tie bolts 94. Associated with the opposite eccentrics 89 are eccentric straps 95 which are connected to cross head 96 (see Fig. 13) which in turn is connected to a connecting rod 97 pivotally attached to the counterweight 118 by a bracket 98.

Figure 16:
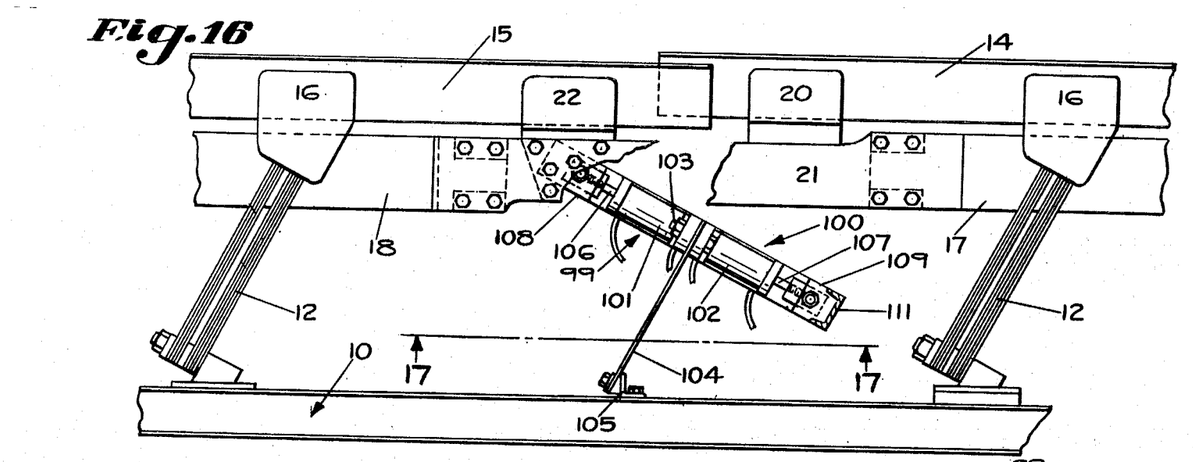
Fig. 16 is an enlarged side elevational view, with parts removed, showing another form of driving mechanism for a vibratory conveyer incorporating my invention, in which the drive is effectuated by a pair of balanced piston type reciprocating motors.
Figures 17, 18:
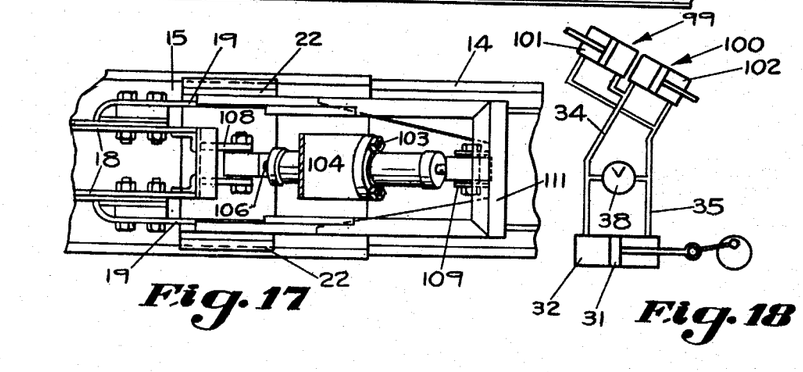
Fig. 17 is an elevational view taken on the line 17—17 of Fig. 16, looking in the direction of the arrows.
Fig. 18 is a piping diagram of the hydraulic system employed in connection with the vibrating mechanism of Figs. 16 and 17.

In Figs. 16 and 17 of the drawings there is illustrated another form of vibratory means for the two decks 14 and 15 which employs hydraulic motor means which differ somewhat from that of Fig. 4 above described. In this vibratory conveyer there is a pair of reciprocating hydraulic cylinder type motors or jacks 99 and 100 which include a pair of cylinders 101 and 102 having their bases rigidly attached together by bolts 103 which also attach said cylinders to a cantilever spring 104 which at its lower end is attached to the base 10 by a bracket 105. The spring 104 preferably lies in a plane parallel with the plane of the spring bars 12.

Each of the cylinders 101, 102 is provided with a piston to which a piston rod is connected, the piston rod of motor 99 being seen at 106 and that of motor 100 being seen at 107. Piston rod 106 is provided with a head which is pivotally attached to a bracket 108 which in turn is rigidly attached to the counterweight 18. Counterweight 18 is rigidly connected to the deck 14 by the connecting plates 19, as previously described. Piston 107 has a head which is pivotally attached to a bracket 109 which in turn is rigidly attached to a U-shaped yoke 111 which is rigidly attached to bracket 22 which in turn is rigidly attached to the deck 15. Deck 15 is rigidly connected to counterweight 17, as previously described.

The drive for the two cylinder motors 99 and 100 is essentially the same as for the cylinder 36 of Fig. 4 of the drawings. It will be noticed that the longitudinal axis of the two hydraulic cylinders or motors 99 and 100 is along the axis of vibration of the two decks 14 and 15 which is perpendicular to the planes of the cantilever bars 12. Furthermore, the instantaneous forces developed by the motors 99 and 100 are opposed to each other, as a consequence of which there will be little tendency for the cylinders 101 and 102 to vibrate. Any unbalance in these forces will not be transmitted to the base 10 in any appreciable amount because of the supporting leaf spring 104. In view of the opposition of the forces developed by the motors 99 and 100 in operation it is, of course, obvious that the two decks 114 and 115 will vibrate oppositely or 180° out of phase.

Figures 19, 20, 21:
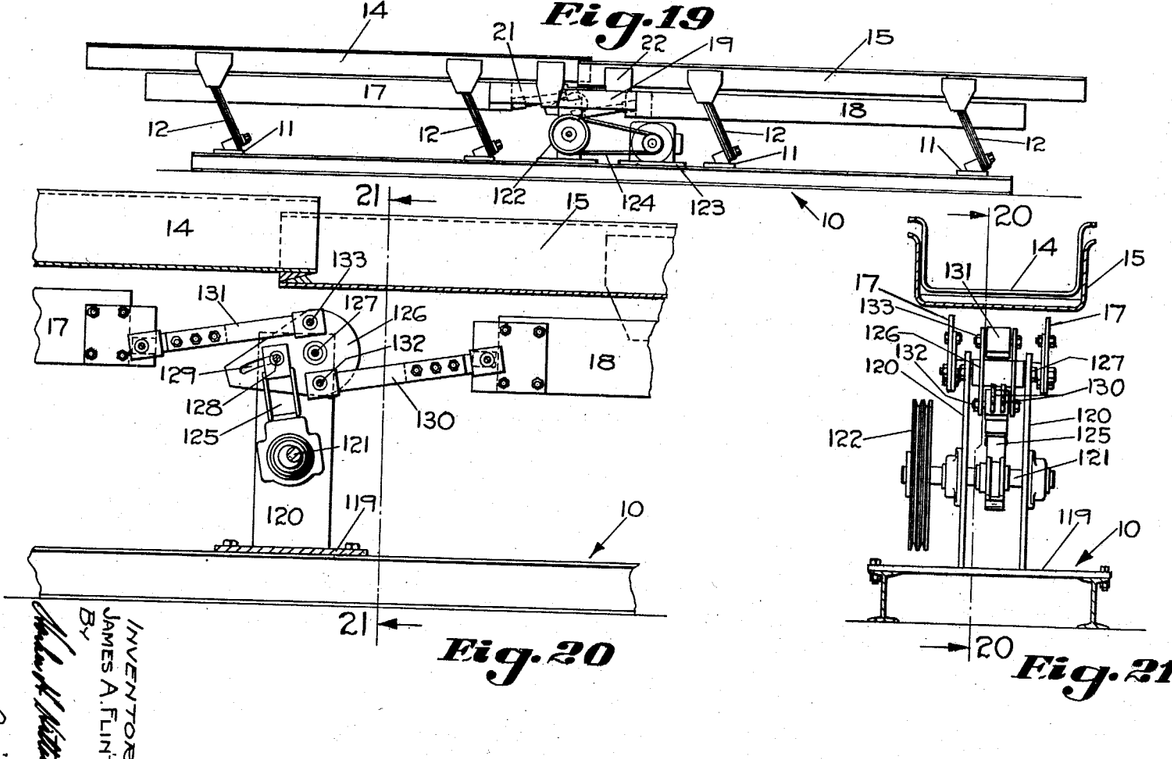
Fig. 19 is a side elevational view of a vibratory mechanical conveyer including a different form of vibrating mechanism comprising one aspect of my invention.
Fig. 20 is an enlarged view showing particularly the deck vibrating mechanism of my invention and including the crank member and associated operating pitman and deck vibrating connecting rods, the decks being shown in section, all taken on the line 20—20 of Fig. 21, looking in the direction of the arrows.
Fig. 21 is a transverse sectional elevational view taken on the line 21—21 of Fig. 20, looking in the direction of the arrows.

The fundamental mode of operation of the conveyer is that above described, particularly in connection with the conveyer of Figs. 1, 2, etc., and needs no repetition. In Figs. 19, 20 and 21 of the drawings there is illustrated a different form of mechanism for vibrating the deck sections 14 and 15.

The vibratory mechanism which is employed is a very simple, efficient and smooth-running mechanism which converts rotary motion into simultaneous reverse cyclic vibratory motion in the two decks 14 and 15. Said vibratory mechanism includes a base 119 which extends transversely of and is rigidly attached to the I-beams of the main frame 10. From the base 119 there is a pair of laterally spaced upstanding plates 120 which, together, constitute a bracket or supporting mechanism for a transversely extending horizontal shaft 121 mounted on appropriately spaced bearings carried by the plates 120 and provided at one end with a pulley 122 adapted to be driven by a motor 123 through V-belts 124.

The shaft 121 drives an eccentric or crank operated pitman 125 which produces a reciprocating motion in response to rotation of the shaft 121. Pitman 125 is pivotally attached at its opposite end to a pivoted crank member 126 which may be formed by a pair of rigidly connected spaced plates (see Figs. 20 and 21), said crank member 126 being pivotally mounted on the plates 120 for oscillatory motion on a transverse horizontal axis, as provided by a pivot pin or bolt 127. The pivotal connection between the opposite end of the pitman 125 and the crank member 126 is provided by a horizontal transversely extending pivot pin or bolt 128 which is adjustable to and from the pivot pin 127 by virtue of an elongated slot 129 which receives the pin 128. Pin 128 is preferably provided with clamp nuts or the equivalent so that it may be clamped in any position in the slot 129. This provides a ready adjustment of the angle through which the crank member 126 will swing during each complete oscillation thereof by the pitman 125, which shall in turn adjust the throw or stroke of the decks 14 and 15, which preferably have the same stroke.

Interconnecting the counterweights 17 and 18 directly, and indirectly the decks 15 and 14 and the crank member 126, is a pair of connecting rods 130 and 131. The outer end of connecting rod 130 is pivotally directly connected to counterweight 18 and indirectly to deck 14. The outer end of connecting rod 131 is pivotally directly connected to counterweight 17 and indirectly to deck 15. The inner end of connecting rod 130 is pivotally connected to crank member 126 at one side or below the axis of pivot pin 127 by pivot pin or bolt 132. The inner end of connecting rod 131 is pivotally connected to crank member 126 at the other side or above the axis of pivot pin 127 by pivot pin or bolt 133. It is to be noted that the pivot pins 132 and 133 are preferably equidistant and on opposite sides of the pivot pin 127. Furthermore, they are preferably in a common plane through the axes of all of said pins 127, 132 and 133. Still further, the normal operating positions of the connecting rods 130 and 131, that is the longitudinal axes thereof, are substantially at right angles to the above mentioned plane. This produces the following results. First of all the right angle relation mentioned means that as the crank member 126 reciprocates the longitudinal travel of the connecting rods 130 and 131 will be a maximum as compared with what it would be if they made acute angles with the mentioned plane. In the second place the equidistant relation of the pins 132 and 133 from the pin 127 means that the generally rectilinear movement of the connecting rods 130 and 131, and thus the vibratory motion of the two decks 14 and 15, will be equal.

If it were desired to make the amplitude of vibration of either deck 14 or 15 greater than the other, the distance between the pivot pin connection between its operating connecting rod and the crank member 126, need only be increased. For example, if the distance between pin 133 and pin 127 is made greater than the distance between pin 132 and pin 127 counterweight 17 and interconnecting deck 15 will have a greater amplitude of vibration than counterweight 18 and deck 14.

The mechanism providing for the equidistant relations is preferred in which the amplitude of vibration of decks 14 and 15 will be the same. By adjusting pivot pin 128 in the slot 129, or, in other words, by adjusting the distance between the pivot pin 127 and the pivot pin 128, the amplitude of vibration of the two decks 14 and 15 (each of the same value) may be adjusted without in any way disturbing the mechanism which insures equal vibration of said two decks 14 and 15.

During the operation of the mechanism the reciprocation of the crank member 126 will produce instantaneous movement of the two decks 14 and 15 in opposite directions and in equal amounts and each complete cycle of operation of each deck 14 and 15 is exactly opposite to, or, in other words, 180° out of phase with, the other.

This application is a continuation in part of my applications Serial Nos. 103,651, filed July 8, 1949, and 135,684, filed December 29, 1949, both of which are entitled Balanced Sectionalized Vibratory Conveyer, and both of which are now abandoned.

Obviously those skilled in the art may make various changes in the details and arrangement of parts without departing from the spirit and scope of the invention as defined by the claims hereto appended, and applicant therefore wishes not to be restricted to the precise construction herein disclosed.

Having thus described and shown an embodiment of the invention, what it is desired to secure by Letters Patent of the United States is:

1. A balanced vibratory conveyer including a main frame, a pair of separate decks mounted to feed one to the other, similar inclined cantilever spring means mounting each of said decks from the same main frame, a counterweight for each deck, means connecting a counterweight to each deck, inclined cantilever spring means mounting each counterweight from said main frame and positioning each counterweight below the particular deck other than the one to which it is connected, said counterweight spring means being substantially duplicates of said deck spring means, each counterweight having approximately the same weight as the deck to which it is connected, and power operated means for simultaneously reversely actuating said two separate decks and connected counterweights.

2. A balanced vibratory conveyer including a main frame, a pair of separate decks mounted to feed one to the other, similar inclined spring means mounting each of said decks from the same main frame, a counterweight for each deck, means connecting a counterweight to each deck, inclined spring means mounting each counterweight from said main frame and positioning each counterweight below the particular deck other than the one to which it is connected, said counterweight spring means being substantially duplicates of said deck spring means, and power operated means for simultaneously reversely actuating said two separate decks and connnected counterweights.

3. A balanced vibratory conveyer including a main frame, a pair of separate decks mounted to feed one to the other, similar inclined cantilever spring means mounting each of said decks from the same main frame, a counterweight for each deck, means connecting a counterweight to each deck, inclined cantilever spring means mounting each counterweight from said main frame and positioning each counterweight below the particular deck other than the one to which it is connected, said counterweight spring means being substantially duplicates of said deck spring means, and power operated means for simultaneously reversely actuating said two separate decks and connected counterweights.

4. In a vibratory feeder, a pair of successive similar decks one feeding the other, a base common to the decks, cantilever bars connecting said decks and base, counterweights, one connected to each deck and laterally substantially entirely between said cantilever bars and extending below the other deck, and cantilever bars for said counterweights also laterally between said first named cantilever bars.

5. A balanced vibratory conveyer including a main frame, a pair of separate decks mounted to feed one to the other, similar inclined cantilever spring means mounting each of said decks from the same main frame, a counterweight for each deck, means connecting a counterweight to each deck, inclined cantilever spring means mounting each counterweight from said main frame and positioning each counterweight below the particular deck other than the one to which it is connected, said counterweight spring means being substantially duplicates of said deck spring means, each counterweight having approximately the same weight as the deck to which it is connected, power operated means for simultaneously reversely actuating said two separate decks and connected counterweights, said power operated means including a shaft, means mounting said shaft for rotation on a spin axis, said means including an upstanding arm pivoted to said base, a pair of eccentrics on said shaft 180 degrees out of phase and of similar eccentricity relative to said spin axis, means connecting one of said eccentrics to one of said decks and its connected counterweight, and means connecting the other of said eccentrics to the other of said decks and its connected counterweight.

6. A balanced vibratory conveyer including a main frame, a pair of separate decks mounted to feed one to the other, similar inclined spring means mounting each of said decks from the same main frame, a counterweight for each deck, means connecting a counterweight to each deck, inclined spring means mounting each counterweight from said main frame and positioning each counterweight below the particular deck other than the one to which it is connected, said counterweight spring means being substantially duplicates of said deck spring means, power operated means for simultaneously reversely actuating said two separate decks and connected counterweights, said power operated means including a shaft, means mounting said shaft for rotation on a spin axis, a pair of eccentrics on said shaft 180 degrees out of phase and of similar eccentricity relative to said spin axis, means connecting one of said eccentrics to one of said decks and its connected counterweight, and means connecting the other of said eccentrics to the other of said decks and its connected counterweight.

7. A balanced vibratory conveyer including a main frame, a pair of separate decks mounted to feed one to the other, similar inclined cantilever spring means mounting each of said decks from the same main frame, a counterweight for each deck, means connecting a counterweight to each deck, inclined cantilever spring means mounting each counterweight from said main frame and positioning each counterweight below the particular deck other than the one to which it is connected, said counterweight spring means being substantially duplicates of said deck spring means, power operated means for simultaneously reversely actuating said two separate decks and connected counterweights, said power operated means including a shaft, means mounting said shaft for rotation on a spin axis, a pair of eccentrics on said shaft 180 degrees out of phase and of similar eccentricity relative to said spin axis, means connecting one of said eccentrics to one of said decks and its connected counterweight, and means connecting the other of said eccentrics to the other of said decks and its connected counterweight.

8. A vibratory conveyer including a base frame, a pair of decks, means mounting said decks in tandem relation on said base frame for vibration, one deck feeding the other, a pair of counterweights also mounted on said base frame for vibration, one of said counterweights being connected to one of said decks and extending below the other deck, the other being connected to the first of said decks and extending therebelow, said deck and counterweight mounting means including similar spring means interconnecting said decks and counterweights, respectively, to said base frame, and means for vibrating said decks and counterweights with each deck vibrating in the opposite direction from the other at any given instant.

9. A balanced vibratory conveyer including a main frame, a pair of separate decks mounted to feed one to the other, similar inclined spring means mounting each of said decks from the same main frame, a counterweight for each deck, means connecting a counterweight to each deck, inclined spring means mounting each counterweight from said main frame and positioning each counterweight below the particular deck other than the one to which it is connected, said counterweight spring means being substantially duplicates of said deck spring means, power operated means for simultaneously reversely actuating said two separate decks and connected counterweights, said decks including a deck frame rigidly attached to the tops of said deck supporting spring means, and a trough removably attached to said deck frame.

10. A balanced vibratory conveyer including a main frame, a pair of separate decks mounted to feed one to the other, similar inclined cantilever spring means mounting each of said decks from the same main frame, a counterweight for each deck, means connecting a counterweight to each deck, inclined cantilever spring means mounting each counterweight from said main frame and positioning each counterweight below the particular deck other than the one to which it is connected, said counterweight spring means being substantially duplicates of said deck spring means, each counterweight having approximately the same weight as the deck to which it is connected, power operated means for simultaneously reversely actuating said two separate decks and connected counterweights, said power operated means including a reciprocating double acting hydraulic pump and a pair of cylinders reversely connected thereto, means connecting one of said cylinders to one of said decks and connecting the other of said cylinders to the other of said decks, and means mounting said cylinders from said main frame independently of either of said decks.

11. A balanced vibratory conveyer including a main frame, a pair of separate decks mounted to feed one to the other, similar inclined cantilever spring means mounting each of said decks from the same main frame, a counterweight for each deck, means connecting a counterweight to each deck, inclined cantilever spring means mounting each counterweight from said main frame and positioning each counterweight below the particular deck other than the one to which it is connected, said counterweight spring means being substantially duplicates of said deck spring means, each counterweight having approximately the same weight as the deck to which it is connected, power operated means for simultaneously reversely actuating said two separate decks and connected counterweights, said power operated means including a reciprocating double acting hydraulic pump and a pair of cylinders reversely connected thereto, means connecting one of said cylinders to one of said decks and connecting the other of said cylinders to the other of said decks, and means mounting said cylinders independently of either of said decks.

12. A balanced vibratory conveyer including a main frame, a pair of separate decks mounted to feed one to the other, similar inclined cantilever spring means mounting each of said decks from the same main frame, a counterweight for each deck, means connecting a counterweight to each deck, inclined cantilever spring means mounting each counterweight from said main frame and positioning each counterweight below the particular deck other than the one to which it is connected, said counterweight spring means being substantially duplicates of said deck spring means, each counterweight having approximately the same weight as the deck to which it is connected, and power operated means for simultaneously reversely actuating said two separate decks and connected counterweights, said power operated means including a hydraulic pump and hydraulic cylinder means connected to both said decks to operate them simultaneously reversely, said hydraulic cylinder means being carried directly by said two decks.

13. A balanced vibratory conveyor including a main frame, a pair of separate decks mounted to feed one to the other, similar inclined cantilever spring means mounting each of said decks from the same main frame, a counterweight for each deck, means connecting a counterweight to each deck, inclined cantilever spring means mounting each counterweight from said main frame and positioning each counterweight below the particular deck other than the one to which it is connected, said counterweight spring means being substantially duplicates of said deck spring means, each counterweight having approximately the same weight as the deck to which it is connected, and power operated means for simultaneously reversely actuating said two separate decks and connected counterweights, said power operated means including a hydraulic pump and hydraulic cylinder means connected to both said decks to operate them simultaneously reversely.

JAMES A. FLINT.

References Cited in the file of this patent

UNITED STATES PATENTS

| Number | Name | Date |
|---|---|---|
| 1,004,186 | Norton | Sept. 26, 1911 |
| 1,146,947 | Norton | July 20, 1915 |
| 1,200,497 | Hosford | Oct. 10, 1916 |
| 1,519,293 | Clark | Dec. 16, 1924 |
| 1,641,435 | Jacobsen | Sept. 6, 1927 |
| 1,720,131 | Lemont | July 9, 1929 |
| 1,820,239 | Merz | Aug. 25, 1931 |
| 2,241,527 | Schieferstein | May 13, 1941 |
| 2,458,077 | Jacobsen | Jan. 4, 1949 |

FOREIGN PATENTS

| Number | Country | Date |
|---|---|---|
| 7,495 of 1900 | Great Britain | Apr. 23, 1901 |